2,997,901
AUTOMATIC DRILL CHANGER

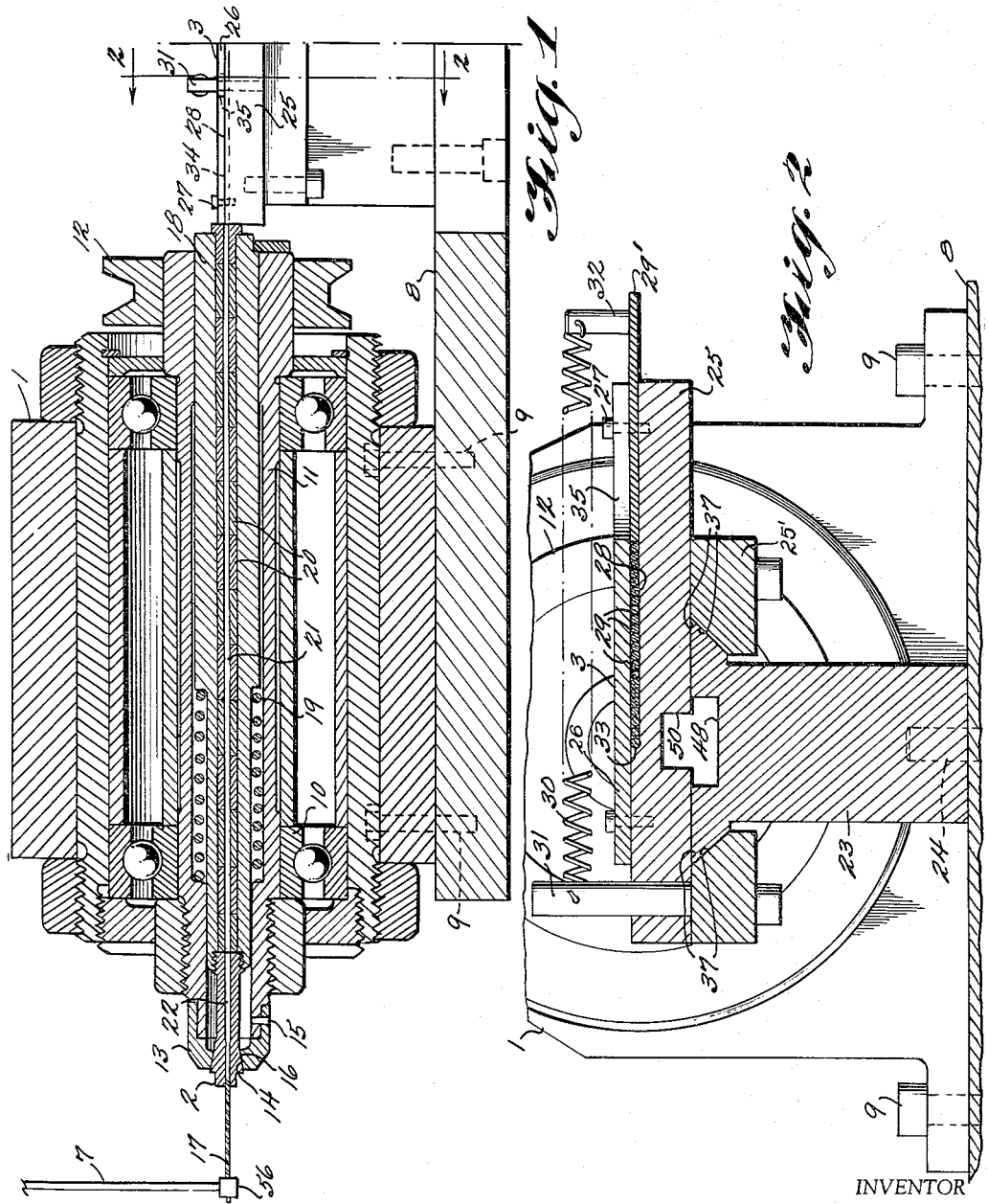

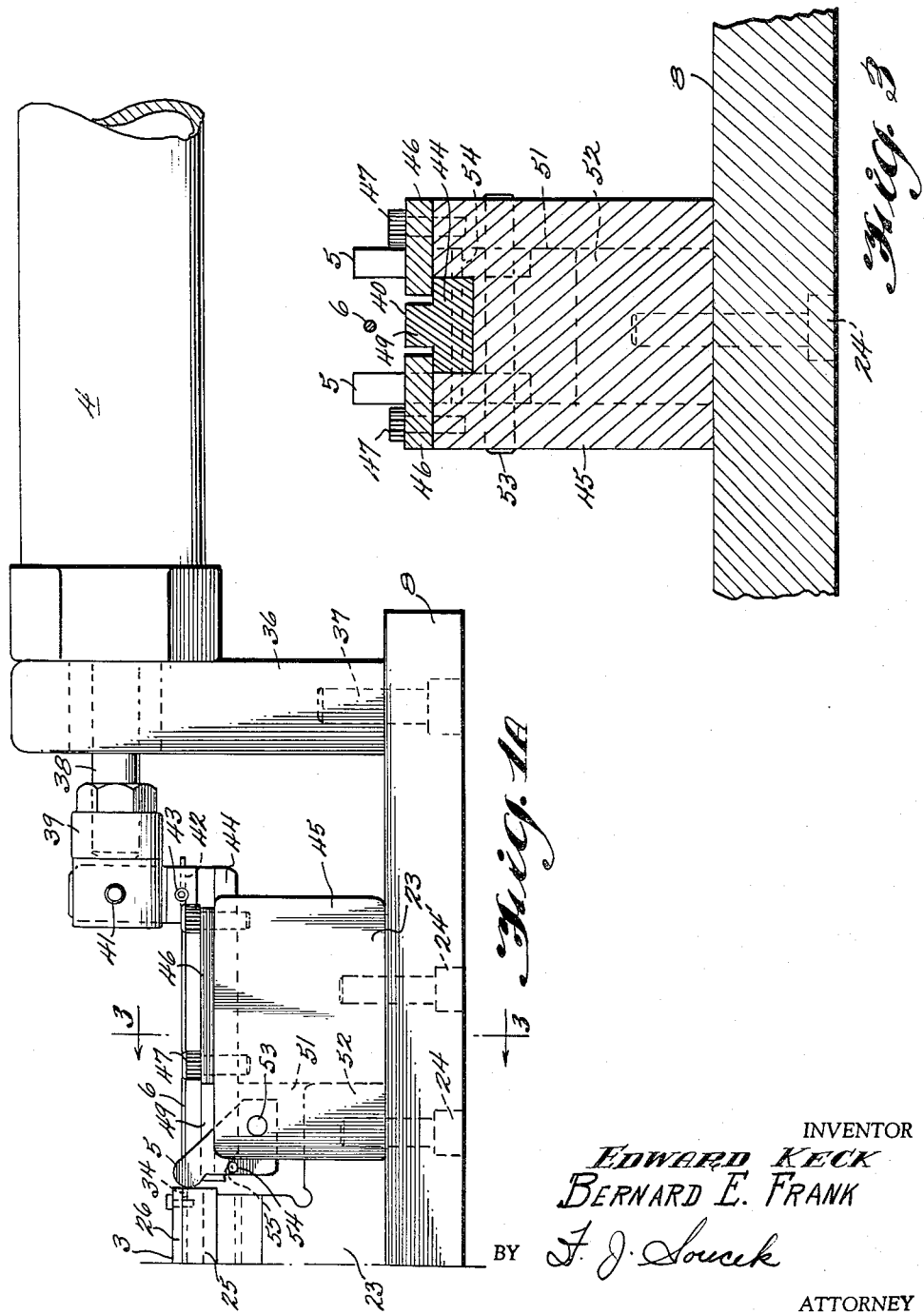

Edward Keck and Bernard E. Frank, Rochester, N.Y., assignors to General Motors Corporation, Detroit, Mich., a corporation of Delaware
Filed Sept. 28, 1959, Ser. No. 842,680
17 Claims. (Cl. 77—32.7)

This invention relates to an automatic drill changer, and particularly to a drill changer that will replace a broken drill automatically without necessitating stopping the drill driving means.

Heretofore, when a drill was broken during its operation, it was necessary to stop the drill chuck or other member driving the drill, remove the broken drill, insert a new drill, and then accelerate the drill and assembly to the angular velocity required for drilling. This operation was especially cumbersome when there was frequent drill breakage or when the drilling operation was used in an assembly line production.

This invention therefore has for its objects, to provide a complete automatic means for changing drills, to provide for automatic drill replacement without stopping the drill driving mechanism, and to provide a rapid drill replacement for eliminating production line stoppages and wasted drill operation time. Other objects will become apparent from the following specification and claims.

This invention is illustrated in the accompanying drawings wherein:

FIGURE 1 is a longitudinal elevation view, partially sectional, of the left portion of an embodiment of this invention.

FIGURE 1A is a longitudinal elevation of the right portion of the embodiment shown in FIGURE 1.

FIGURE 2 is a transverse sectional view taken through line 2—2 of FIGURE 1.

FIGURE 3 is a transverse sectional view taken through line 3—3 of FIGURE 1A.

Like parts are indicated by like characters through the specification and drawings.

This invention generally includes a housing, denoted by numeral 1, for rotatably supporting a drill collet 2; a drill magazine, denoted by numeral 3; an air cylinder 4; fingers 5 and a stripping rod 6 actuated by the air cylinder 4; and a broken drill sensing probe 7. The housing 1 is secured to a base 8 by bolts 9 extending through a horizontal flange of the housing 1. The housing 1 rotatably supports by the frictionless bearings 10 a hollow shaft 11 that is driven by a belt (not shown) and a pulley 12. The hollow shaft 11 may be driven by a chain and sprocket combination or could be secured directly within the rotor of an electrical motor.

A locking lug 13 with an axially inwardly tapered aperture 14 is secured to the shaft 11 by a tapered locking pin 15. A drill collet 2 has an axially inwardly tapered outer circumferential surface 16 that is normally in frictional engagement with the tapered aperture 14 for providing sufficient locking force on a collet drill 17 and for rotationally driving the collet 2 and drill 17.

The inner end of the collet 2 is threadedly secured to a collet pull bar 18 that is biased by the spring 19 to bring about engagement of the tapered surfaces 14 and 16. A single cylindrical bushing or a series of cylindrical bushings 20 are inserted within an axial cylindrical passage in the collet pull bar 18. The bushings 20 provide a continuous axial passage 21 extending from the axial passage 22 of the collet 2 to the end of the collet pull bar adjacent the drill magazine 3. To provide flexibility, different drill sizes may be used by installing a collet 2 and bushings 20 with a passage diameter appropriate to the drill size selected.

The drill magazine 3, best shown in section in FIGURE 2, is slidingly mounted on a stanchion 23 that is secured to the base 8 by the bolts 24. The drill magazine 3 has an upper support member 25 and a lower support member 25' secured together by bolts or other known means. The support members 25 and 25' have ways 37 that slidingly engage the mating surfaces of the stanchion 23, allowing longitudinal movement of the magazine 3 relative to the stanchion 23. A transverse horizontal slot 28 is provided on the upper surface of the base 25. This slot is covered by a plate 26 secured to the base 25 by the screws 27. The slot is of such depth and longitudinal width that replacement drills 29, within the range of sizes for which this device may be adapted, may freely slide or roll transversely within the slot.

A slide 29' moves transversely within the slot 28 between the base 25 and the cover plate 26. A spring 30 is attached between pins 31 and 32 secured to the base 25 and the slide 29' respectively. The spring 30 biases the slide 29' transversely against replacement drills 29 to compact the drills laterally. The cover plate 26 has a transverse slot 35 to allow movement of the pin 32 within the extremities of the plate 26, therefore allowing greater transverse movement of the slide 29'. The end 33 of the slot 28 is so positioned that a drill adjacent the end 33 will be longitudinally aligned with the passage 21 in the bushings 20. A passage 34 (FIGURES 1 and 1A) extends longitudinally in both directions from the end 33 to provide a conduit for supplying a magazine drill to the passage 21 and to provide access to a magazine drill by the stripping rod 6.

As shown in FIGURE 1A, the air cylinder 4 is secured to a stanchion 36 that is fixed to the base 8 by bolts 37. A cylinder rod 38 reciprocates a carriage 40 (FIGURE 3) by means of a bifurcated lug 39 that is threaded to the rod 38 and secured to the carriage 40 by the pin 41. The stripping rod 6 is secured within a longitudinal passage 42 of the carriage 40 by the set screw 43. The longitudinal position of the stripping rod 6 is adapted to be adjusted so that the forward end of the rod is inserted within the passage 34 of the drill magazine when the carriage 40 and cylinder rod 38 are in the retracted position. This positioning will provide for guidance of the stripping rod 6 during initial forward longitudinal movement.

Referring to FIGURE 3, the carriage 40 has a lower horizontal extending portion 44 that reciprocates within a horizontal longitudinal slot formed between a stanchion 45 and the cover plates 46 fastened to the stanchion 45 by the machine screws 47. The lower portion 44 also reciprocates when extended within a slot 48 of the magazine supported stanchion 23 (FIGURE 2). The carriage 40 has a vertically extending portion 49 that loosely reciprocates between the cover plates 46 and within a slot 50 of the drill magazine base 25 (FIGURE 2).

The stanchion 45 is fixed to the base 8 by the bolt 24'. It has a vertical slot 51 into which extends a projection 52 of the stanchion 23 for aligning the stanchions 23 and 45, thereby aligning the carriage 40 and the drill magazine 3.

Two fingers 5 are rotably mounted within the slot 51 by the pin 53. A second pin 54 is fixed to the center forward portions of the fingers 5. On the forward underside of the carriage 40, there is a tapered cam surface 55, that, upon forward reciprocation of the carriage 40, engages the pin 54 and actuates the fingers 5 forwardly about the axis of the pin 53. The fingers 5 will engage the drill magazine 3 and move it longitudinally on the ways 37 to engage the collet pull bar 18 or the bushings 20, and reciprocate them forwardly against the bias of spring 19.

A capacitance or proximity probe 7 is positioned adjacent the extremity of the drill 17 prior to the drilling operation. Upon the breaking of a drill 17, electrical means measuring the change of capacitance between the probe 7 and the broken drill will actuate the air cylinder 4 for cycling the automatic drill changer and positioning a replacement drill.

The probe 7 is shown as having a cylindrical end 56 through which the drill 17 extends. This is a preferred probe construction due to its better capacitance sensitivity; hovever, a probe end which is only semi-cylindrical and which includes a slot on the bottom side may be desirable, as the probe may then be swung from its contiguous relationship with the drill end.

The probe 7 will necessarily have to be repositioned during the drilling operation. This may be accomplished by supporting the probe on the workpiece carriage, so that the probe will move axially with the workpiece. The probe 7 may also be actuated by the workpiece or workpiece carriage and be swung away from the drill during the drililng operation. During the time the probe is swung away from the workpiece, the probe electrical system would necessarily have to be inactivated. The means of supporting the probe 7 and the electrical means for converting the capacitance change into actuation of cylinder 4 are not specifically described nor included in the drawings as they are not a part of this invention, and any means well known in the art may be applied to accomplish those results.

Operation

In operation the probe 7 will sense a broken drill and will by an electrical circuit operate the air cylinder 4 to cycle the carriage 40. Initial forward movement of the carriage 40 through the cam surface 55 will actuate the fingers 5 to move longitudinally the drill magazine 3, the collet pull bar 18, and the collet 2. This forward movement of the collet 2 will relieve the drill pressure brought about by the wedging action of the tapered surfaces 14 and 16, thereby allowing free axial movement of the drill 17.

Further forward movement of the carriage 40 will strip a drill from the drill magazine by the stripping rod 6. The drill will pass through the passage 34 into the passage 21 of the bushings 20. The passage 21 will already have been filled with drills, and therefore the broken drill will be driven from the collet 2 and a replacement drill will be inserted.

The air cylinder actuating system should be such that it will automatically retract upon completion of the forward stroke. Then the magazine slide 29' will move another drill in position for stripping, and the collet 2, the pull bar 18 and the magazine 3 will resume their initial position due to the bias of spring 19. The stroke of the air cylinder and the longitudinal position of the stripping bar 6 will determine the length of the drill projecting from the collet. Upon the completion of a cycle of the cylinder, a new drill will have been installed in the collet, the collet will be reengaged for driving the drill, and the drill magazine will have another drill in position ready to be actuated by the stripping rod.

It can be readily seen that the complete drill changing operation is accomplished rapidly and automatically without necessitating stopping the drive motor or the drive pulley 12.

It is to be understood that the construction herein specifically disclosed and described is only one form incorporating our invention, and the structure may take other forms without departing from the scope of this invention.

Having thus described our invention, what we claim is:

1. In an automatic drill changer for a rotating drill, the combination comprising, drill collet means normally engaging and rotating a drill, means releasing the collet engaging pressure on said drill, a drill magazine storing replacement drills for said collet, a stripping rod for directing replacement drills into said collet, and a single motor means chronologically actuating said releasing means and said stripping rod to automatically replace the drill in the collet.

2. In an automatic dispensing device, the combination comprising a collet normally engaging one dispensable article, a first means selectively actuating the said collet to release the said engaged article, a storage device for said articles, a second means conveying one of the said stored articles to the collet subsequent to the releasing of the said engaged article, and single motor automatically cycling the said first and second means.

3. In an automatic dispensing device, the combination comprising, a collet normally engaging one dispensable article, said one dispensable article normally projecting from the collet a predetermined amount, an actuating means releasing the said engaged article in the said collet, a storage device storing a plurality of said articles, means conveying the said stored articles individually from the said storage device to the said collet when the collet is in the released position, single motor means cycling said actuating and conveying means, and a capacitance sensing device operating the motor means upon sensing a projection of the said dispensable article from the said collet substantially less than the said predetermined amount.

4. In an automatic drill changer, the combination comprising, a collet normally engaging one end of a drill, a capacitance probe adjacent the other end of said drill sensing drill breakage, means disengaging the said drill, a drill storage device in communication with said collet, means conveying a stored drill from said storage device to said collet when the collet drill is disengaged, and single motor means operated by said capacitance probe cycling the collet actuating means and the drill conveying means.

5. An automatic drill changing device for a rotating drill comprising a rotating drill collet releasably driving a drill projecting therefrom, a capacitance sensing probe adjacent the outer end of said drill, a drill magazine storing replacement drills, a passage communicating between said drill magazine and said collet, a first reciprocating means releasing said collet drill, a second reciprocating means stripping a drill from said magazine and forcing a drill into drilling position within said collet, and single motor means chronologically actuating said first and second reciprocating means, said motor being automatically operated by said probe when the probe senses drill breakage.

6. An automatic drill changing device for a rotating drill comprising, a drill collet releasably driving a drill supported at one end thereof, said collet being driven within a rotating shaft and being axially movable within said shaft to drivingly release the said collet from said shaft and to drivingly release the supported drill from the collet, a drill magazine storing replacement drills, a passage axially communicating between said collet and said magazine, a plurality of replacement drills in said magazine having their axes parallel to the axis of said collet, one of said replacement drills being positioned within the axial passage and the remaining replacement drills being laterally offset therefrom, means adapted to consecutively convey the remaining drills into the axial passage, a drill stripping rod reciprocably mounted on an axial extension of said passage adapted to strip said one replacement drill from the magazine and force a drill into drilling position in said collet, and motor means actuating axially said collet and said stripping rod to replace the drill within the collet.

7. The device of claim 6, comprising capacitance probe means adjacent the outer end of said collet supported drill, and means automatically operating the said motor means upon the sensing by the capacitance probe of drill breakage.

8. An automatic drill changing device comprising, a driven shaft, a drill holding collet drivably supported within the said shaft, said collet releasably driving a drill at one end of said drill, drill probe means adjacent the other of said drill for sensing drill breakage, a drill magazine with stored drills having their axes parallel to the axis of said driven shaft, an axial passage extending to said collet from adjacent one end of said magazine, one of said stored drills being positioned in axial alignment with the axial passage and the remaining stored drills being laterally offset therefrom, means adapted to consecutively convey the remaining drills into the axial passage, a stripping bar reciprocably mounted on an axial extension of said axial passage adapted to strip said one drill from said magazine and force a new drill into said collet, a reciprocably mounted carriage carrying said stripping rod, means operated by said carriage to release the drill in said collet, motor means reciprocating said carriage, and automatic motor control means to cycle said motor upon the said probe sensing drill breakage.

9. The device of claim 8, comprising a collet pull bar fastened to said holding collet, spring means axially biasing said pull bar for drivingly engaging the collet and the collet driving shaft, and said drill releasing means including means to reciprocate said pull bar to release the driving engagement.

10. An automatic drill changing device comprising, a driven shaft, a drill collet, said collet including means releasably driving a drill supported at one end thereof, means releasably driving the collet by the shaft, a drill storage device having stored drills, one of said stored drills being positioned in axial alignment with the axis of the collet and the remaining drills being laterally offset therefrom, means consecutively biasing said remaining stored drills into said axial alignment, stripping rod means in axial alignment with said collet adapted to strip said one stored drill from said magazine and inject a new drill into said collet; actuating means chronologically releasing the collet and drill driving means, and injecting a new drill by reciprocating the stripping rod means; and motor means cycling the actuating means.

11. An automatic drill device as described in claim 10, further comprising a drill breakage sensing means operating the said motor means.

12. An automatic drill device as described in claim 10, wherein the drill collet driving means comprises, mating tapered frictional surfaces on the external contour of the collet and the internal contour of the shaft, and means biasing the mating tapered surfaces into driving engagement.

13. An automatic drill device as described in claim 10, wherein the actuating means comprises a reciprocating carriage, pivotally mounted finger members rotationally actuated by said carriage, and means actuated by said fingers releasing the collet and drill driving means, said last named means including the drill storage device.

14. An automatic drill changer as described in claim 13, wherein the motor means comprises a fluid servo mechanism having a piston rod connected to the said reciprocating carriage.

15. An automatic drill changing device comprising a rotating hollow shaft, an internal tapered portion on said shaft, a drill collet having an external tapered portion mating with said internal tapered portion, a spring biasing said tapered portions into driving engagement, a drill storage device, an axial passage communicating between said collet and said storage device, said storage device having a chamber with a plurality of replacement drills stored therein, one of said replacement drills being in axial alignment with said passage, means consecutively conveying the remaining replacement drills into axial alignment, a reciprocating carriage having a stripping rod secured thereto, said stripping rod positioned on an axial extension of the axial passage adjacent to said storage device; means including a pivoted member adapted to be engaged by said carriage, actuating said collet against the biasing spring for releasing the driving engagement; said member being actuated upon initial reciprocating movement of the carriage, and further movement of said carriage causing the stripping rod to strip said one drill from the storage device and inject a new drill in the collet, and motor means reciprocating the carriage.

16. The device of claim 15 further comprising a broken drill sensing means cycling the motor means.

17. An automatic drill changing device comprising, a rotating shaft, a drill collet driven by said shaft and releasably driving a drill supported at one end thereof, reciprocating means upon reciprocation thereof releasing the drill drive, a drill storage device having a plurality of replacement drills, a stripping rod in axial alignment with said collet adapted upon reciprocation to inject a replacement drill into said collet, means chronologically reciprocating said reciprocating means and said stripping rod, and a motor cycling said last named means; said last named means including a reciprocating carriage supporting said stripping rod and actuated by said motor, and a pivotally mounted member pivoted by said carriage and actuating said reciprocating means.

References Cited in the file of this patent

UNITED STATES PATENTS

| 2,883,890 | Fink et al. | Apr. 28, 1959 |

FOREIGN PATENTS

| 1,033,991 | Germany | July 10, 1958 |

UNITED STATES PATENT OFFICE
CERTIFICATE OF CORRECTION

Patent No. 2,997,901                          August 29, 1961

Edward Keck et al.

It is hereby certified that error appears in the above numbered patent requiring correction and that the said Letters Patent should read as corrected below.

Column 3, line 19, for "drililng" read -- drilling --; column 4, line 10, after "and" insert -- a --; column 5, line 3, after "other" insert -- end --.

Signed and sealed this 10th day of April 1962.

(SEAL)
Attest:

ERNEST W. SWIDER                          DAVID L. LADD
Attesting Officer                            Commissioner of Patents